United States Patent Office 3,315,258
Patented Apr. 18, 1967

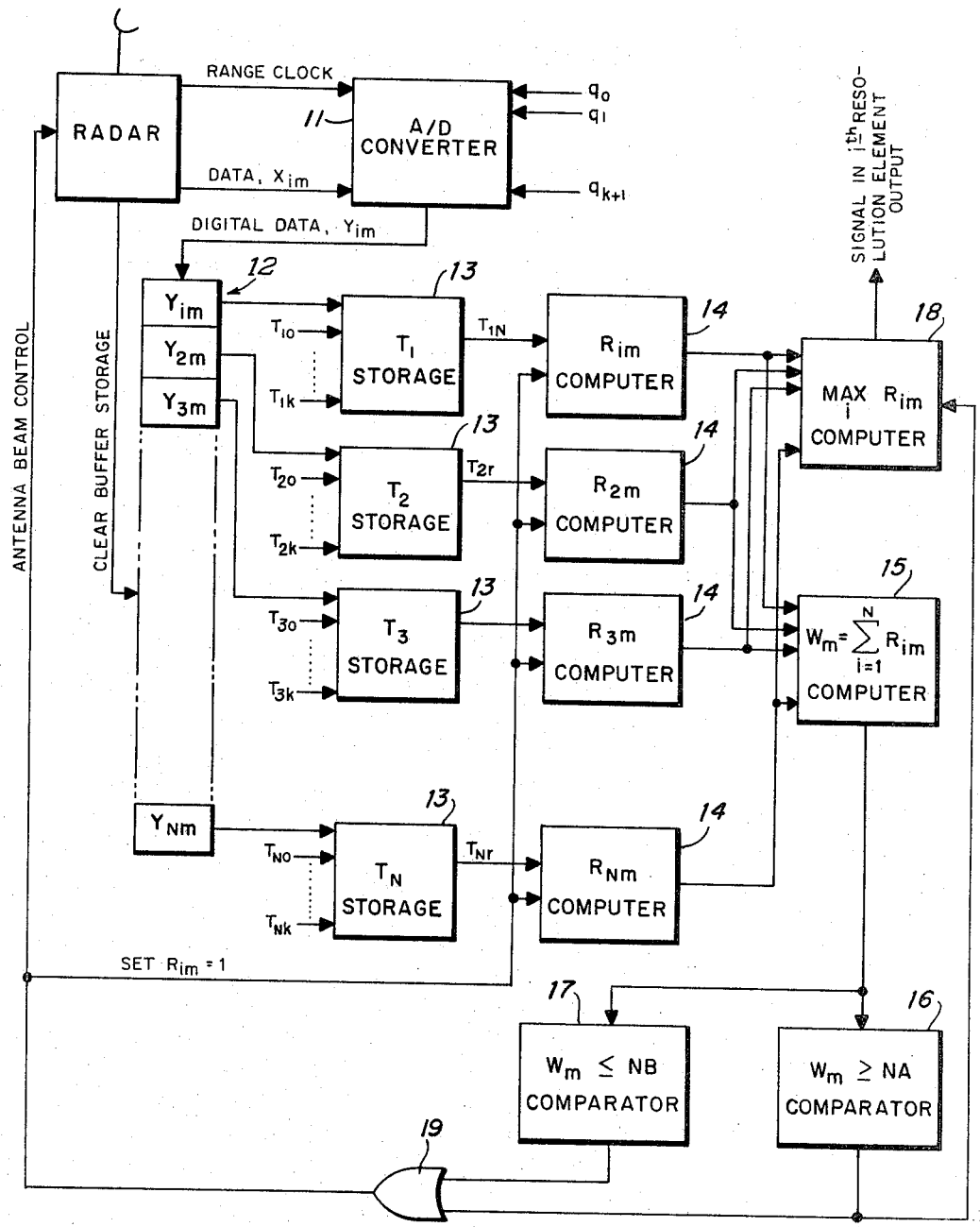

3,315,258
METHOD AND MEANS FOR SEQUENTIAL SIGNAL DETECTION IN MULTIPLE-RESOLUTION-ELEMENT DATA
George M. Dillard, San Diego, Calif., assignor to the United States of America as represented by the Secretary of the Navy
Filed Apr. 23, 1965, Ser. No. 450,550
11 Claims. (Cl. 343—17.1)

The invention described herein may be manufactured and used by or for the Government of the United States of America for governmental purposes without the payment of any royalties thereon or therefor.

This invention relates to a method and means for sequential signal detection which is especially advantageous in the detection of the presence of signal or the absence of signal in multiple-resolution-element data.

The signal-to-noise ratio of data such as that received by radar systems, for instance, may render the detection of target information most difficult. Moreover, the existence of multiple-resolution-elements in each beam position of a radar such as range or velocity, for example, complicates the detection of the intelligence contained in the data. However, significantly improved performance is made possible through the application of sequential detection techniques as contrasted to fixed sample lengths tests for the detection of target signals and/or intelligence contained in such radar data. A number of publications, including M. B. Marcus and P. Swerling, "Sequential Detection in Radar With Multiple Resolution Elements," I.R.E. Transactions on Information Theory, vol. IV-8, pp. 237–245, April 1962, and A. Wald, "Sequential Analysis," John Wiley and Sons, Inc., New York, N.Y., 1947, have contributed to the development of improved techniques for the sequential signal detection as applied to radar having multiple-resolution-elements.

It is a primary object of the present invention to provide an improved method and apparatus for multinomially quantizing multiple-resolution-elements of data for the sequential detection of information contained within such data.

Another most important object of the present invention is to provide such method and apparatus for the sequential detection of signal information in multi-resolution-elements of data including the quantization of discrete multiple-resolution-data elements which have been separated in accordance with a particular resolution characteristic.

Yet another object of the present invention is to provide such a sequential detection apparatus and method wherein such discrete data elements are quantized in accordance with a function of the ratio of the probability that the data are signal-plus-noise data to the probability that the data are noise-only data, such ratio reflecting the operative capabilities and design criteria of the source of the initial multiple-resolution-element data.

An equally important object of the present invention is to provide such a method and apparatus wherein the quantization means is adapted to receive punched tape or similar data containing parameters characteristic of the operative capabilities and design criteria representative of a specific source of the initial multiple-resolution-element data.

A further object of the present invention is to provide such an apparatus and method wherein discrete multiple-resolution-data elements, having been separated and categorized in accordance with a like resolution characteristic, are cumulatively combined until a decision is reached for "signal" or "no signal."

A still further object of the present invention is to provide a method and apparatus for the sequential detection of the presence of signal in multiple-resolution-element data including the cumulative combination of discrete multiple-resolution-elements of like characteristic and the further step of identification of the maximum of such cumulatively combined discrete multiple-resolution-element data of like character after a decision indicative of the presence of signal has been reached.

The present invention conceives a method and apparatus which receives multiple-resolution-element data and separates such data into discrete multiple-resolution-elements in accordance with a particular resolution characteristic such as range or velocity information as may be contained in radar system data, for instance. In response to at least one resolution characteristic of such separated discrete multiple resolution data elements, each data element is quantized as a function of the ratio of the probability that the data are signal-plus-noise data to the probability that the data are noise-only data, which ratio reflects the operative capabilities and design criteria of the source of the initial multiple resolution-element data such as a particular radar apparatus, for example. The quantized data elements are then stored with data elements of like resolution character so that, for example, successive discrete data elements of like range or velocity or other selected resolution characteristic are stored together. The data elements of like resolution character are then combined by an appropriate operation which may comprise multiplying successive discrete data elements of like resolution characteristic. The plurality of accumulated combined data resolution elements are then summed and compared to two references, one having a high limit and the other a low limit. If the sum is greater than the high limit, a decision is made indicative of the presence of signal in the original multiple-resolution-element data. If, on the other hand, the summed data is less than the lower limit a decision is reached that no signal is present in the initial multiple-resolution-element data. In either of these two cases the apparatus is cleared for re-cycling in accordance with the previously described sequence of steps of operation. If the sum falls in between the lower limit and the upper limit, the system continues to operate in the method and manner described above and the data is accumulated until a "signal" or "no signal" decision is reached. In the event that the sum of the combined quantized data elements indicates the presence of signal, an appropriate method and means is provided to identify the accumulated combined quantized data of like resolution character which is maximum among the plurality of such accumulated combined data so as to identify the particular resolution characteristic containing the signal information.

Those skilled and knowledgeable in the art will recognize that the concept of the present invention has the advantage of cumulatively developing data in accordance with an identifiable resolution characteristic and quantized probability ratios reflecting the operative capabilities of the apparatus which is the source of such data initially. Moreover, the present invention includes within its concept the identification of the particular resolution characteristic having the maximum cumulative combined data elements thereby virtually eliminating ambiguity as to which multi-resolution-element of a plurality of such resolution elements contained positive signal information.

In accordance with the concept of the present invention, the improved method may be embodied in computer apparatus responsive to punched tape or other conventional means for storing probability ratios, multinominal quantization levels, and similar appropriate information reflecting operative characteristics and design criteria of the signal source with which the apparatus is to be employed.

These and other objects, features and advantages of the present invention will be apparent from the description of an embodiment of the invention contained hereinafter and its scope will be more particularly pointed out in the appended claims.

In the drawing there is shown a schematic block diagram incorporating aparatus and means to carry out the steps of operating upon multiple-resolution-element input data in accordance with the concept of the present invention.

Marcus and Swerling suggested a system for applying sequential analysis to a multiple-resolution-element radar and compared the theoretical performance of the particular described sequential detection system as compared with a fixed-sample test system. In order to compare the two systems, bounds for the error probabilities for the sequential system were given. However, the average sample number (ASN) required for the sequential system was obtained by simulation.

Several assumptions are involved in describing the application of the system suggested by Marcus and Swerling to the case of binomially quantized data. The data before quantization are assumed to have either the Gaussian or the Rice distribution. The ASN required (obtained by simulation) and bounds for the error probabilities are given. The binomial-sequential system is compared with the optimum fixed sample test system and power savings are indicated for the cases compared.

Consider a search radar with N resolution elements at a fixed beam position. Let $x_{ij}$ be the return observed from the $i$th resolution element after the $j$th main bang. Then the vector $$X_i^m = (x_{i1}, x_{i2}, \ldots, x_{im})$$

is the data from the $i$th resolution element after the first $m$ main bangs. Suppose that $f(X_i^m, a)$ is the joint probability density function of $X_i^m$, where $a$ is related to the strength of the expected (design) signal. ($a=0$ when only noise is present.) The sequential probability radio test suggested by Marcus and Swerling is utilized to test the hypothesis $H_0$ that no resolution element contains signal against hypothesis $H_1$ that one and only one signal is present, with equal probability of being in any particular resolution element. The resulting probability ratio is $$\lambda_m = \frac{1}{N} \sum_{i=1}^{N} \frac{f(X_i^m, a)}{f(X_i^m, 0)} \qquad (1)$$

If independence between observations is assumed (as will be done hereafter) then $$f(X_i^m, a) = f(x_{i1}, a) \cdot f(x_{i2}, a) \ldots f)x_{im}, a)$$

and Equation 1 becomes $$\lambda_m = \frac{1}{N} \sum_{i=1}^{N} \prod_{j=1}^{m} \frac{f(x_{ij}, a)}{f(x_{ij}, 0)} \qquad (2)$$

For binomial quantization it may be supposed that on the $j$th observation each $x_{ij}$, $i=1, 2, \ldots, N$ is compared with a reference level $q$ and that the variable $y_{ij}$ is given the value 1 if $x_{ij} \geq q$ and the value 0 otherwise. Let $p_{io}$ be the probability $x_{ij} \geq q$ when only noise is present in the $i$th resolution element, and let $p_{is}$ be the probability $x_{ij} \geq q$ when a signal (of design strength) is present in the $i$th resolution element. If $S_{im}$ is the total number of 1's in the sample $(y_{i1}, y_{i2}, \ldots, y_{im})$ then $S_{im}$ has the binomial distribution. The probability ratio is now $$\lambda_m = \frac{1}{N} \sum_{i=1}^{N} \left\{\frac{p_{is}}{p_{io}}\right\}^{S_{im}} \left\{\frac{1-p_{is}}{1-p_{io}}\right\}^{m-S_{im}} \qquad (3)$$

After each observation the ratio 3 is calculated and compared with bounds A and B ($0 < B < A$). Hypothesis $H_0$ is accepted if $\lambda_m \leq B$, $H_1$ is accepted if $\lambda_m \geq A$, and another observation (main bang) is made if $B \leq \lambda_m \leq A$. In either of the first two cases the beam is moved to a new position and the process is repeated.

Obtaining analytically the ASN required for this simplified version of the Marcus and Swerling test appears formidable. However, simulation is accomplished easily, provided the 2N values $p_{io}$ and $p_{is}$, $i=1, 2, \ldots, N$ are determined and the bounds A and B are given.

Following Marcus and Swerling, the probability of a false alarm ($pfa$) is defined as the reciprocal of the expected number of resolution elements which can be examined in the presence of noise between the occurrence of a false alarm.

If $N(pfa) \ll 1$ and $\beta$ ($\beta$=probability of a false dismissal) are chosen as the desired error probabilities, then according to Wald $$A = (1-\beta)/N(pfa) \qquad (4)$$

$$B = \beta/(1-N(pfa)) \qquad (5)$$

are good choices for the bounds A and B. In fact prob reject $H_0$ when $H_0$ true $\leq N(pfa)/(1-\beta)$ (6)

prob reject $H_1$ when $H_1$ true $\leq \beta/(1-N(pfa))$ (7)

Both 6 and 7 are "favorable" inequalities for practical values of $\beta (\leq 0.5)$ and $N(pfa)$ ($pfa$ of the order of $10^{-8}$). For $\beta = \leq 0.5$, the right side of 6 is approximately $N(pfa)$, and since $N(pfa) \ll 1$, the right side of 7 is approximately $\beta$.

Suppose the received data in the $i$th resolution element are assumed to have the Gaussian probability density function $$g(x_{ij}, a) = 1/\sqrt{2\pi} \exp[-(x_{ij}-a^2/2] \qquad (8)$$

where $a^2/2$ is the design signal-to-noise power ratio. Then $$p_{io} = \int_p^\infty g(x, 0) dx \qquad (9)$$

and $$p_{is} \int_q^\infty g(x, a) dx = \int_{q-a}^\infty g(x, 0) dx \qquad (10)$$

both of which can be obtained from a table of the Gaussian (normal) probability function.

If the received data are obtained by sampling the pulse envelope, in most cases the data from the $i$th resolution element can be asumed to have the Rice distribution $$h(x_{ij}, a) = x_{ij} \exp[-(x_{ij}^2+a^2)/2] I_0(ax_{ij}) \qquad (11)$$

where $x_{ij}$ is the normalized magnitude of the pulse envelope (normalized by dividing by the R.M.S. noise voltage); $a$ is the normalized design signal amplitude; $a^2/2$ is the signal-to-noise power ratio; and $I_0(x)$ is the modified Bessel function of the first kind, order zero. In this case $$p_{io} \int_q^\infty h(x, 0) dx = \exp[-q^2/2] \qquad (12)$$

$$p_{is} \int_p^\infty h(x, a) dx = 1 - \exp[-(q^2+a^2)/2] \sum_{n=1}^\infty (q/a)^n I_n(aq) \qquad (13)$$

where $I_n(x)$ is the modified Bessel function of the first kind, order $n$. With the aid of a computer both $p_{io}$ and $p_{is}$ can be obtained by a direct computation. Equation 13 is also known as $Q(a, q)$ which is tabulated for many combinations of values of $a$ and $q$.

Given the design signal-to-noise power ratio $a^2/2$ and the probability distribution of the received data, then the probabilities $p_{io}$ and $p_{is}$ are functions only of the quantizing level $q$. Obviously, some care must be taken in choosing the value of $q$. A reasonable choice seems to be that value of $q$ which minimizes the expected sample size of a sequential test performed on the data from a single resolution element, when only noise is present and while the error probabilities are held fixed.

Unfortunately, it is not always possible to make this "reasonable" choice for $q$ since problems due to excess over the boundaries A and B at termination are encountered when attempting to hold the error probabilities fixed while varying $q$. For purpose of illustration in the foregoing explanation the test bounds were calculated from Equations 4 and 5 (with $N=1$) and Wald's approximation to $E_0(n)$ which appears at p. 100 of the referenced Wald publication) was minimized as a function of $q$. The same value of $q$ was then used for all values of $N$.

Significantly improved results are made possible by increasing the number of levels into which the data are quantized. The probability ratio in this case would result from the multinomial distribution, of which the binomial is a special case. As the number of levels are increased, the loss from quantization can be made to go to zero by properly choosing quantization intervals (analogous to and with the same problems as the previously mentioned procedure for choosing $q$). Experimental and analytical results (for a sequential test on the data from a single resolution element) have shown that in some cases as few as eight levels would result in a loss of less than 0.1 db in signal-to-noise ratio compared with a sequential test on the unquantized data.

For multinomial quantization of the received data suppose that on the $j^{\text{th}}$ observation each $x_{ij}$, $i=1,2,\ldots,N$ is compared with a set of reference levels $q_0, q_1, \ldots q_{k+1}$ where $q_0$ and $q_{k+1}$ are the smallest and largest values, respectively which can be taken by $x_{ij}$. Let Then
$$y_{ij} = r \text{ if } q_r \leq x_{ij} \leq q_{r+1}$$

Let
$$Pr\{y_{ij} = r\} = Pr\{q_r \leq x_{ij} \leq q_{r+1}\}$$

$$p_{is}(r) = Pr\{y_{ij} = r\}$$

when a signal is present in the $i^{\text{th}}$ resolution element and let $$p_{io}(r) = Pr\{y_{ij} = r\}$$

when only noise is present in the $i^{\text{th}}$ resolution element. If $m_{ir}$ is the number of $r$'s in the sample ($y_{i1}, y_{i2}, \ldots, y_{im}$) then ($m_{io}, m_{i1}, \ldots, m_{ik}$) is multinomially distributed. The probability ratio is now $$\lambda_m = (1/N) \sum_{i=1}^{N} \left[\frac{p_{is}(0)}{p_{io}(0)}\right]^{m_{io}} \left[\frac{p_{is}(1)}{p_{io}(1)}\right]^{m_{i1}} \cdots \left[\frac{p_{is}(k)}{p_{io}(k)}\right]^{m_{ik}}$$
(14)

If
$$T_{ir} = p_{is}(r)/p_{io}(r)$$
(15)

then 14 can be written as $$\lambda_m = (1/N) \sum_{i=1}^{N} (T_{io})^{m_{io}} (T_{i1})^{m_{i1}} \cdots (T_{ik})^{m_{ik}}$$
(16)

After each observation the ratio 16 is calculated and compared with the bounds $A$ and $B$. Hypothesis $H_0$ is accepted if $\lambda_m \leq B$, hypothesis $H_1$ is accepted if $\lambda_m \geq A$, and another observation is made if $B \leq \lambda_m \leq A$. In either of the first two cases the beam is moved to a new position and the process is repeated.

In the drawing is shown a block diagram of radar detector embodying apparatus for accomplishing the concept of the present invention for multiple-resolution-element sequential detection utilizing the Marcus and Swerling test on multinomially quantized data.

The parameters $T_{io}$, $T_{ik}$ Equation 15 are stored in a plurality of storage means 13 and labeled Storage for each $i=1,2,\ldots,N$ where N is the number of resolution elements under consideration. Each $R_{im}$ Computer, as shown at 14, is a device which forms the product of two numbers and retains the product until either a new product is formed or the product is set equal to 1. The $$\text{Max } R_{im}$$

Computer 18 determines which $R_{im}$ product is maximum and produces this information upon being triggered by the $W_m \geq NA$ Comparator 16. The $W_m$ Computer 15 computes the sum of the $R_{im}$ products $$\left(W_m = \sum_{i=1}^{N} R_{im}\right)$$

The $W_m \geq NA$ Comparator 16 and $W_m \leq NB$ Comparator 17 compare $W_m$ with the bounds NA and NB, respectively, and produce an output when the comparison is satisfied. The Set $R_{im}=1$ line sets each $R_{im}=1$ when the comparison is satisfied in either of the comparators; also the Antenna Beam Control causes the beam to assume the next position when either of the comparisons is satisfied. The detector of the drawing receives multiple-resolution-element data from a radar apparatus 10. An $A/D$ Converter 11 converts to digital form the data from the resolution elements of interest, as controlled by a Radar Range Clock, for example. The output of the $A/D$ Converter 11, is equivalent (i.e., some coded form such as BCD or Gray Code) to the number $r$ if $$q_r \leq x_{ij} < q_{r+1}$$

A Buffer Storage 12 stores the digital data from the $A/D$ Converter 11 while computations are being made, and is reset (cleared) by the Clear Buffer Storage output from the radar apparatus.

The detector operates as follows: Initially $R_{io}=1,2,\ldots,N$ and the Buffer Storage 12 is cleared. After the $m^{\text{th}}$ pulse is transmitted (in a particular beam position), the data $X_{im}$ from the N resolution elements of interest as controlled by the Radar Range Clock, are converted to digital form by the $A/D$ Converter 11. The outputs $y_{im}$ of the $A/D$ converter 11 are some coded form of the number $r$ if $$q_r \leq x_{im} < q_{r+1}$$

The data $y_{im}$, $i=1,2,\ldots,N$ are temporarily stored in buffer storage 12. The output of $T_i$ storage 13 will be multinomially quantized as $T_{ir}$ when $y_{im}=r$. $R_{im}$ computers 14 receive the outputs of storage means 13 and each then computes the product $$T_{ir}R_{i,m-1} = R_{im} \quad (R_{io}=1)$$

A $W_m$ computer 15 then receives and sums the $R_{im}$ products to form the sum $W_m$. $W_m$ is compared with the bounds NA and NB in comparators 16 and 17, respectively; if neither $W_m \geq NA$ nor $W_m \leq NB$, another pulse is transmitted in the same beam position. The digital data $y_{i,m+1}$, $i=1,2,\ldots,N$ are stored in buffer storage 12, $R_{i,+1}$, $i=1,2,\ldots,N$ are calculated, and $W_{m+1}$ is calculated and compared with the bounds NA and NB in the comparators 16 and 17. These processes are repeated until either $W_m \geq NA$ or $W_m \leq NB$, at which time the contents of the $R_{im}$ comparators 14 are set equal to 1 and the radar beam is moved to a new position by actuation of the OR gate 19 responsive to the output of comparators 16 or comparator 17. As illustrated in the drawing the output of the OR gate 19 provides an antenna beam control signal which is connected to the original source of signals such as the radar. Simultaneously with the calculation of $W_m$ in the computer 15, the $$\text{Max } R_{im}$$

computer 18 determines the maximum of the $R_{im}$ products developed in the $R_{im}$ comparators 14 and if $W_m \geq NA$, comparator 16 triggers the $$\text{Max } R_{im}$$

computer 18 and causes an output which indicates the presence of a target in the resolution element corresponding with $$\text{Max } R_{im}$$

From the foregoing description and disclosure it will be evident to those skilled in the art that the concept of the present invention not only contemplates the use of weighted multinomial quantization reflecting the operative characteristics and design criteria of the apparatus developing the initial multi-resolution-element data but also employs such data to accumulate the basis for reaching a decision for "signal" or "no signal." Such data remains available until a decision is reached and when a decision indicating the presence of signal is reached, in accordance with the teaching and concept of the present invention, means are provided for selecting that particular resolution element which has the maximum accumulated data indicating that the significant signal information is contained within such resolution element. Typically, resolution elements of this kind may include range and/or velocity of a target in a radar system.

Additionally, detector apparatus capable of operating upon multiple-resolution-element data in accordance with the method of the present invention may include computer storage means adapted to receive and retain probability ratios, performance characteristics and design criteria representative of the particular system with which the detector is used. Accordingly, the operation of the detector may be modified and changed by clearing such stored information and substituting therefor appropriate information representative of any other system with which it is desired to use the detector. Such modification may be readily accomplished by punched tape or other suitable means.

Though the present invention has been described herein in term of its application and use employing method and means especially adapted in specific terms to data of the multiple-resolution-element type as developed by a radar system, it is to be understood that the concept and teaching of the present invention is not limited in its spirit and scope to application in radar systems but may be equally as well employed to detect the presence of significant signal information in multiple-resolution-element data developed in different types of systems.

What is claimed is:

1. An apparatus for the sequential detection of signal in multiple-resolution-element data comprising:
   means for receiving and separating said data into its discrete multiple resolution elements;
   means responsive to at least one resolution characteristic of said discrete multiple-resolution data elements for quantizing each said discrete data element as a function of the ratio of the probability that the data are signal-plus-noise to the probability that the data are noise-only data, such ratio reflecting the operative capabilities of the source of said multiple-resolution-element data;
   means for receiving and separately storing quantized data elements of like resolution character;
   means for cumulatively combining sucessive quantized data elements of like resolution character;
   means for summing said combined successive quantized data elements;
   first and second comparator means arranged to receive said sum of combined successive quantized data elements for comparing said sum with first and second quantized references, respectively, said first comparator means being operably responsive when said sum exceeds said first quantized reference to produce an output indicative of the presence of signal in said received data, and said second comparator means being operably responsive when said second quantized reference exceeds said sum to produce an output indicative of the absence of signal in said received data; and
   means responsive to the output of said first comparator for selecting the maximum of said combined successive quantized data elements of like resolution character.

2. An apparatus as claimed in claim 1 wherein said means responsive to at least one resolution characteristic of said discrete multiple resolution data elements is operative to binomially quantize each said discrete data element as a function ratio of the probability that the data are signal-plus-noise data to the probability that the data are noise-only data, such ratio reflecting the operative capabilities of the source of said multiple-resolution-element data.

3. An apparatus as claimed in claim 1 wherein said means responsive to at least one resolution characteristic of said discrete multiple-resolution-data elements is operative to multinomially quantize each said discrete data element as a function of the ratio of the probability that the data are noise-only data, such ratio reflecting the operative cabilities of the source of said multiple-resolution-element data.

4. An apparatus as claimed in claim 1 wherein said means responsive to at least one resolution characteristic of said discrete multiple-resolution data element is operative to quantize each said discrete data element in proportion to the ratio of the probability that such data are signal-plus-noise data to the probability that the data are noise-only data, such ratio reflecting the operative capabilities of the source of said multiple-resolution-element data.

5. An apparatus as claimed in claim 1 wherein said means for cumulatively combining successive quantized data elements of like resolution character is operative to multiply said successive quantized data elements.

6. An apparatus as claimed in claim 1 wherein said means for quantizing each said discrete data element as a function of the ratio of the probability that the data are signal-plus-noise data to the probability that the data are noise-only data and in accordance with the operative capabilities of the source of said multiple-resolution element data is responsive to a selected resolution characteristic of said discrete multiple resolution data elements.

7. An apparatus as claimed in claim 1 and including means responsive to the output of said first or second comparator for accepting a new sequence of multiple-resolution-element data.

8. An apparatus as claimed in claim 7 wherein said means responsive to the output of said first or second comparator for accepting a new sequence of multiple-resolution element data is operative to clear said apparatus for recycling.

9. The method of sequentially detecting the presence of signal in multiple-resolution-element data comprising the steps of:
   separating said data into its discrete multiple resolution elements;
   quantizing each discrete multiple resolution element in accordance with a resolution characteristic of such data elements and as a function of the ratio of the probability that the data are signal-plus-noise data to the probability the data are noise-only data from the operative capabilities of the source of such multiple-resolution-element data;
   separately storing quantized data elements of like resolution character;
   cumulatively combining successive quantized data elements of like resolution character;
   summing combined successive quantized data elements;
   comparing the sum of combined successive quantized data elements with high and low quantized references;
   producing an output indicative of the presence or absence of signal when the sum exceeds the high quantized reference or the low quantized refence exceeds the sum, respectively, and
   selecting the maximum of the combined successive quantized data elements in response to the output indicative of the presence of signal.

10. The method of sequentially detecting the presence of signal in multiple-resolution-element data as claimed in claim 9 and including the step of continuing to accumulate quantized data in accordance with the claimed method when said sum of cumulatively combined data neither exceeds said high quantized reference nor is less than said low quantized reference.

11. The method of sequentially detecting the presence of signal in multiple-resolution-element data as claimed in claim 10 and including the further step of terminating accumulation of quantized data at a predetermined point of said accumulation when said sum of cumulatively combined data neither exceeds said high quantized reference nor is less than said low quantized reference.

References Cited by the Applicant

UNITED STATES PATENTS 2,977,587  3/1961  Herbst.
3,114,909  12/1963  Varela.
3,145,379  8/1964  Caspers.
3,156,914  11/1964  Welti.

OTHER REFERENCES

IRE Transactions on Information Theory, Sequential Detection in Radar With Multiple Resolution Elements, M. B. Marcus and P. Swerling, 1962.

RODNEY D. BENNETT, *Primary Examiner.*